May 15, 1956  P. RAPPAPORT  2,745,973
RADIOACTIVE BATTERY EMPLOYING INTRINSIC SEMICONDUCTOR
Filed Nov. 2, 1953
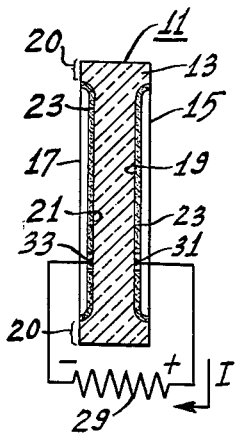
Fig_1
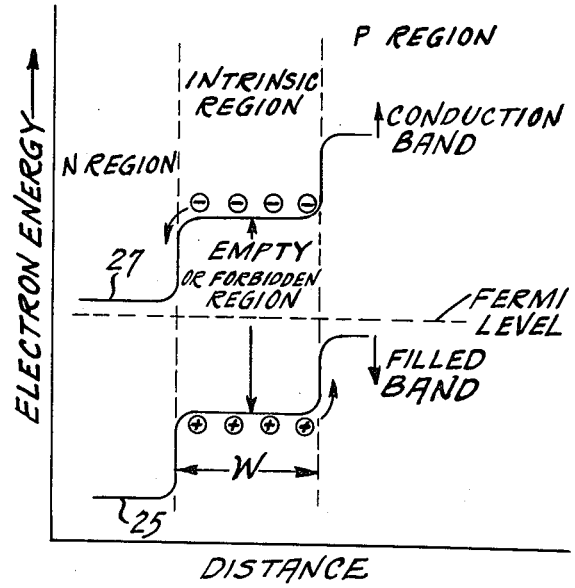
Fig_2
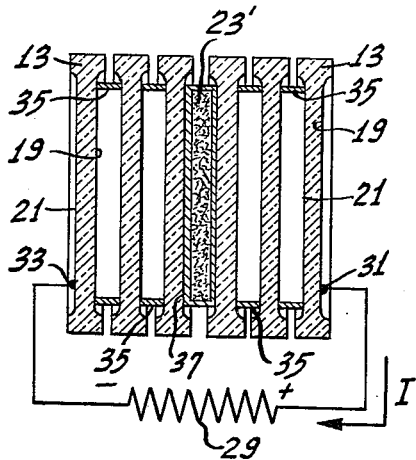
Fig_3
INVENTOR.
Paul Rappaport
BY
ATTORNEY

United States Patent Office 2,745,973
Patented May 15, 1956

2,745,973
RADIOACTIVE BATTERY EMPLOYING INTRINSIC SEMICONDUCTOR

Paul Rappaport, Princeton, N. J., assignor to Radio Corporation of America, a corporation of Delaware Application November 2, 1953, Serial No. 389,601

19 Claims. (Cl. 310—3)

This invention is an improvement upon methods and structure disclosed and claimed in my copending application Serial No. 365,207, filed June 30, 1953, and relates to improved methods and means for converting the energy of nuclear radiations into useful electrical energy. Particularly the invention relates to the nuclear irradiation of a semiconductive device which employs a body portion having a resistivity substantially in or near the intrinsic region. The irradiated device produces useful electrical power which is available at its output terminals and which may be utilized to supply voltage and current to a load circuit.

An object of the invention is to provide improved methods of and means for converting the energy of nuclear radiations into useful electrical energy.

Another object of the invention is to provide improved methods of and means for converting the energy of either charged or neutral high energy radiations into useful electrical energy.

Another object of the invention is to provide more efficient methods and means for converting the energy of nuclear radiations into electrical energy.

A further object of the invention is to provide a radioactive battery of the above type characterized by reduced electron-hole surface recombination.

A further object of the invention is to provide an improved junction type semiconductive device employing a material having a resistivity substantially in or near the intrinsic region.

A further object of the invention is to provide an improved radioactive battery employing a semiconducting body portion having a resistivity substantially in or near the intrinsic region.

A further object of the invention is to provide an improved radioactive battery having an extremely long life.

A still further object of the invention is to provide an improved radioactive battery which is especially suitable for powering transistor and other low power demand circuits.

The foregoing objects and advantages are provided in accordance with the invention by subjecting a junction type semiconductive device to radiations emitted by a radioactive source. The device includes a body portion of semiconducting material having a resistivity substantially in or near the intrinsic range. The junction regions are formed at oppositely disposed surfaces of the body portion and are of N and P type conductivity, respectively. The radiations penetrate the device to liberate charge carriers therein (electrons and holes) which flow within the device and effectively are collected to provide a potential at its output terminals. The energy of the output potential thus developed may be utilized to supply current to a load circuit.

The invention will be described in detail with reference to the accompanying drawing in which:

Figure 1 is a schematic diagram of a radioactive battery, according to the invention;

Figure 2 is an energy level diagram which is helpful in describing the theory of operation of the device of Figure 1; and Figure 3 is a schematic diagram of an embodiment of the invention in which a plurality of junction type semiconductive devices are connected in series to provide a desired output voltage.

Similar reference characters are applied to similar elements throughout the drawing.

Referring to Figure 1, a novel radioactive battery 11 comprises a junction type semiconductive device including a body portion 13 of semiconducting material which has a resistivity substantially in or near the intrinsic region. The term "intrinsic" is employed herein as definitive of a substantially pure semiconducting material, i. e., a material wherein very few donor or acceptor atoms are present. Such materials are characterized by a number of factors, one of which is very high resistivity. Typical body portion materials include germanium, silicon, and other semiconductors such as cadmium sulfide and the intermetallic compounds. For purposes of the present example, however, it is assumed that a germanium body is employed and that the resistivity of the germanium is at least 30 ohm-centimeters.

P and N type conductivity regions are formed at oppositely disposed body surfaces 15 and 17, respectively, by an alloying process. A P-type junction region 19 is formed by alloying into surface 15 a material such as indium, boron, gallium, or alloys including these materials. The N-type junction region 21 is formed in a like manner by alloying into body surface 17 arsenic, antimony, or alloys including these materials. For a detailed description of the alloying technique per se, reference may be made to a copending application Serial No. 294,741, filed June 20, 1952, by Charles W. Mueller. After the P and N junctions have been formed, the materials yielding the P and N type conductivities are removed from the portions of the body 13 wherein they are alloyed. The materials (for example, indium in the one case and antimony in the other case) may be removed by immersing the device in purified liquid mercury or in a hydrochloric acid bath. The removal of these materials does not affect the junction regions 19 and 21 and affords the advantage of reducing absorption by the materials of radioactive rays or particles.

Preferably the body portion 13 then is trimmed so that the end portion 20 of the body is relatively small. As will be shown later, reducing this dimension reduces electron-hole recombination at the ends of the body and enhances the output current of the unit.

The structure thus far described is arranged so that the device is subjected to emissions from a cold source of high energy nuclear radiations. The term "cold" is definitive of a radioactive source and is used herein in contradistinction to thermionic. The source may comprise one or a combination of materials which emit charged particle radiations and/or neutral radiations. Such emitters may include, for example, polonium and uranium (both emitters of positively charged alpha particles), strontium$^{90}$ or tritium (emitters of negatively charged beta particles), cobalt$^{60}$ (an emitter of neutral gamma rays), and numerous other radioactive isotopes.

The radioactive source may be spaced from the junction device described above but preferably is supported thereby. It is preferred that the source take the form of films 23, 23 of radioactive emitter which are applied to the junction regions 19 and 21 of the device. The thickness of the semiconducting body 13 is made sufficiently great that substantially all the radiations emitted by the films 23, 23 are absorbed by the body. For example, with a strontium$^{90}$ source a germanium device having a thickness of the order of fifty mils is adequate.

The thickness of a similarly irradiated silicon device is of the order of one hundred mils.

The theory of operation of the instant radioactive battery is as follows. The radiations emitted by the radioactive films 23, 23 interact with the valence bonds of the semiconductor in the N-intrinsic-P device. With the incoming radiation having a minimum quantum energy which is equal to or greater than the energy gap of the empty or forbidden region, charge carriers (electrons and holes) are liberated within the device. The liberation of these charge carriers corresponds to raising electrons from the filled band 25 to the conduction band 27 thereby leaving behind holes in the filled band. The energy gaps for germanium and silicon, for example, are of the order of 0.72 electron volts and 1.12 electron volts, respectively.

Electrostatic potential barriers exist in the junction regions between the P and intrinsic regions of the device and between the intrinsic and N regions of the device. Under the influence of these potential barriers the liberated charge carriers flow across the junctions 19 and 21. An electron which approaches the junction region 21 sees an electric field of proper polarity for the electron to be collected. However, a hole approaching the junction region 21 is repelled by the electrostatic field. In a like manner holes which approach the junction region 19 are collected and electrons are repelled. In a device where only one junction is present on a body of semiconductor, carriers approaching the surface opposite the junction usually disappear due to surface recombination. The present invention considerably reduces recombination except for end effect. As mentioned previously, the ends of the body 13 are trimmed so that very little recombination occurs at the ends of the device. Since it is highly desirable that electrons or holes repelled at one junction be collected by the electrostatic field at the other junction, the diffusion length of the charge carriers should be at least twice the width W of the intrinsic body 13. In the present instance, i. e., a 30 ohm-centimeter germanium body 50 mils thick, this requirement is met. The collection or separation of electrons and holes in the above manner results in a voltage being developed by the battery and the flow of an output current I through a load circuit 29. The load circuit 29 may be connected to the battery by ohmic connections 31 and 33 such as by well known solders which make contact to the P and N sections of the device, respectively.

The apparatus described above affords a primary source of electrical energy which has numerous advantages. The overall battery size is extremely small and may be of the order of a fraction of a cubic centimeter. The unit is a self-contained primary source of energy in the sense that the electrical energy available at its output terminals is derived solely from the energy of radioactive emissions. No thermionic cathodes or external electrical inputs are required. The battery is rugged from a physical standpoint and is not substantially affected by vibration or mechanical shock. The battery impedance is appreciably lower than presently known primary radioactive energy sources and is particularly adapted for powering transistor and other circuits which require low voltages and low currents. The battery life also is considerably increased. For example, a battery employing 30 ohm-centimeter germanium has a life expectancy which is of the order of 300 times the life of a similar battery employing 1 ohm-centimeter germanium. Also, the output current of the device is considerably enhanced. This is because the charge carrier diffusion length is considerably longer in substantially intrinsic materials and electron-hole recombination is reduced. The output voltage is relatively high with the instant type of device because the N and P regions are of as high a conductivity as possible. The voltage output is independent of the resistivity of the body material.

Figure 3 shows an embodiment of the invention which is adapted for producing a higher voltage than the apparatus of Figure 1. A plurality of junction devices are stacked so that radioactive emission from a centrally located radioactive source 23' successively penetrates adjacent semiconductive devices. Ohmic contact between adjacent units is afforded by means of annular conductive rings 35. The dimensions of the devices are such that as a practical matter these rings 35 may be loops of wire. The devices are stacked so that a given ring 35 contacts the P region of one device and the N region of an adjacent device. The units thus are serially connected. The radioactive emitter 23' preferably is contained within a hollow conductive housing 37, the housing 37 thereby providing electrical contact between N and P regions of the devices most closely adjacent the source 23'. Ohmic connection to the load circuit 29 is made in substantially the same manner hereinbefore described with reference to Figure 1.

The number of semiconductive units stacked in this manner depends on the particular voltage desired. For most efficient use of high energy radiations emitted by the source 23', it is preferred that the number of units be sufficiently great to absorb substantially all the emitted radiations.

While the foregoing embodiments of the invention have been described as employing alloy type junction semiconductive devices utilizing substantially intrinsic material it is pointed out that grown junction devices may be fabricated in accordance with known techniques and employed with equal facility.

What is claimed is:

1. A primary source of electrical energy comprising, a body of semiconducting material having a resistivity substantially in or near the intrinsic region, a P-type conductivity region formed at one surface of said body, an N-type conductivity region formed at an opposing surface of said body, a source of nuclear emission for irradiating said body to establish a difference in electric potential between said regions, and connection means coupled to said regions for supplying the energy of said potential to a load circuit.

2. A primary source of electrical energy comprising, a body of germanium having a resistivity substantially in or near the intrinsic region, a P-type conductivity region formed at one surface of said body, an N-type conductivity region formed at an opposing surface of said body, a source of nuclear emission for irridating said body to establish a difference in electric potential between said regions, and connection means coupled to said regions for supplying the energy of said potential to a load circuit.

3. A primary source of electrical energy comprising, a body of silicon having a resistivity substantially in or near the intrinsic region, a P-type conductivity region formed at one surface of said body, an N-type conductivity region formed at an opposing surface of said body, a source of nuclear emission for irradiating said body to establish a difference in electric potential between said regions, and connection means coupled to said regions for supplying the energy of said potential to a load circuit.

4. A primary source of electrical energy comprising, a body of cadmium sulfide having a resistivity substantially in or near the intrinsic region, a P-type conductivity region formed at one surface of said body, an N-type conductivity region formed at an opposing surface of said body, a source of nuclear emission for irradiating said body to establish a difference in electric potential between said regions, and connection means coupled to said regions for supplying the energy of said potential to a load circuit.

5. A primary source of electrical energy comprising, a body of germanium having a resistivity of at least thirty ohm-centimeters, a P-type conductivity region formed at one surface of said body, an N-type conductivity region formed at an opposing surface of said body, a source of nuclear emission for irradiating said body to establish a difference in electric potential between said regions, and connection means coupled to said regions for supplying the energy of said potential to a load circuit.

6. A primary electrical energy source as claimed in claim 1 wherein the width of said semiconducting body is less than one-half the diffusion length of charge carriers produced in said body as a result of said irradiation.

7. A primary source of electrical energy comprising, a body of semiconducting material having a resistivity substantially in or near the intrinsic region, a P-type conductivity region formed by alloying a first material into one surface of said body, an N-type conductivity region formed by alloying a second material into an opposing surface of said body, a source of nuclear emission for irradiating said body to establish a difference in electric potential between said regions, and connection means coupled to said regions for supplying the energy of said potential to a load circuit.

8. A primary electrical energy source as claimed in claim 1 wherein said source of nuclear emissions is supported on at least one of said P and N type conductivity regions.

9. A primary electrical energy source as claimed in claim 1 wherein said source of nuclear emissions comprises separate films of a radioactive isotope supported by said P and N type conductivity regions.

10. A primary electrical energy source as claimed in claim 1 wherein said nuclear emission source is an emitter of negatively charged beta particles.

11. A primary electrical energy source as claimed in claim 1 wherein said nuclear emission source is an emitter of neutral gamma rays.

12. A primary source of electrical energy comprising, a source for providing nuclear emissions, a plurality of junction type semiconductive devices disposed in the path of said emissions, each of said devices including a body of semiconducting material having a resistivity substantially in or near the intrinsic region and having P and N type conductivity regions formed in opposing body surfaces, each of said devices developing a terminal voltage in response to irradiation by said emissions, and connection means coupled to said devices for deriving a load current.

13. A primary electrical energy source as claimed in claim 12 wherein said plurality of semiconductive devices are spaced successively from said emission source and means is provided for making ohmic contact between the N and P regions of adjacent devices.

14. A primary source of electrical energy comprising, a body of semiconducting material, a P-type conductivity region formed at one surface of said body, an N-type conductivity region formed at an opposing surface of said body, a source of radioactive emission for irradiating said body to establish a difference in electric potential between said regions, and connection means coupled to said regions for supplying current to a load circuit.

15. A primary source of electrical energy comprising, a body of semiconducting material having a resistivity of at least thirty ohm-centimeters, a P-type conductivity region formed at one surface of said body, an N-type conductivity region formed at an opposing surface of said body, a source of radioactive emission for irradiating said body to establish a difference in electric potential between said regions, and connection means coupled to said regions for supplying current to a load circuit.

16. A primary source of electrical energy comprising, a body of semiconducting material having a resistivity of at least thirty ohm-centimeters, a first rectifying junction region formed in one surface of said body, a second rectifying junction region formed in an opposing surface of said body, a source of radioactive emission for irradiating said body to establish an electric potential between said first and second regions, and connection means coupled to said regions for supplying current to a load.

17. A primary source of electrical energy comprising, a body of semiconducting material, a P-type conductivity region formed in said body, an N-type conductivity region formed in said body at a region spaced from said P-type region, a source of radioactive emission for irradiating said body to establish a difference in electric potential between said regions, and connection means coupled to said regions for supplying current to a load circuit.

18. A primary source of electrical energy comprising, a body of semiconducting material having a resistivity of at least thirty ohm-centimeters, a P-type conductivity region formed in said body, an N-type conductivity region formed in said body at a region spaced from said P-type region, a source of radioactive emission for irradiating said body to establish a difference in electric potential between said regions, and means coupled to said regions for supplying current to a load circuit.

19. A primary source of electrical energy comprising, a body of semiconducting material having a resistivity of at least thirty ohm-centimeters, a first rectifying junction region formed in said body, a second rectifying junction region formed in said body at a region spaced from said first region, a source of radioactive emission for irradiating said body to establish a difference in electric potential between said regions, and connection means coupled to said regions for supplying current to a load.

No references cited.